United States Patent [19]

Quesinberry et al.

[11] 3,796,965

[45] Mar. 12, 1974

[54] VOLTAGE DROOP COMPENSATION CIRCUIT FOR TRAVELING WAVE TUBES

[75] Inventors: Arden L. Quesinberry, Towson; Peter G. Espersen, Glen Burnie, both of Md.

[73] Assignee: Westinghouse Electric Corporation, Pittsburgh, Pa.

[22] Filed: Dec. 28, 1971

[21] Appl. No.: 213,084

[52] U.S. Cl. .................................... 330/43, 330/199
[51] Int. Cl. .................................... H03f 3/58
[58] Field of Search .................................... 330/43

[56] References Cited

UNITED STATES PATENTS

| | | | |
|---|---|---|---|
| 3,114,886 | 12/1963 | Santis et al. | 332/13 |
| 3,165,696 | 1/1965 | Poole | 330/43 X |
| 3,051,910 | 8/1962 | Rigrod | 330/43 X |
| 3,038,068 | 6/1962 | MacDowell et al. | 330/43 X |
| 3,150,331 | 9/1964 | Rambo | 330/43 X |

*Primary Examiner*—Nathan Kaufman
*Attorney, Agent, or Firm*—D. Schron

[57] ABSTRACT

Voltage droop on the body of an electronic traveling wave tube during the time of response to an input pulse is compensated by transferring energy from the less critical collector supply to the body supply. A compensation circuit is connected in series with the body supply and includes a compensation capacitor charged by autotransformer action from the collector supply, thereby producing a rise voltage compensating for the drop in cathode voltage of the body supply and thereby minimizing the droop in the body to cathode voltage.

5 Claims, 8 Drawing Figures

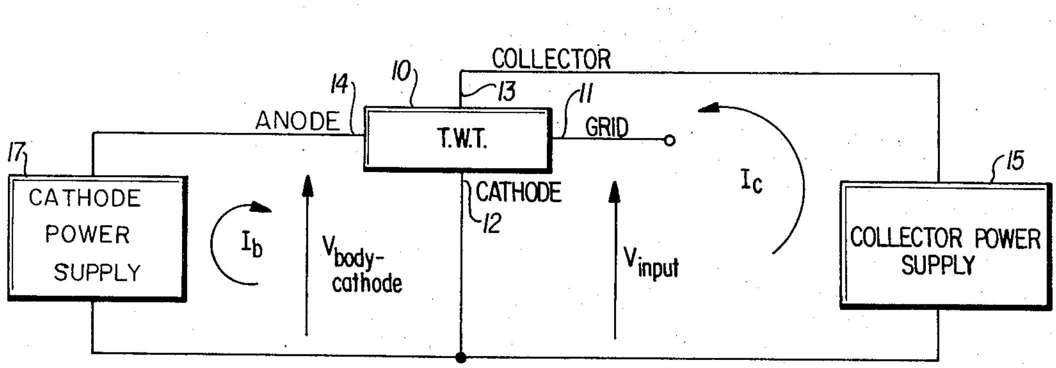
FIG. 1 T.W.T. CIRCUIT SCHEMATIC (PRIOR ART)
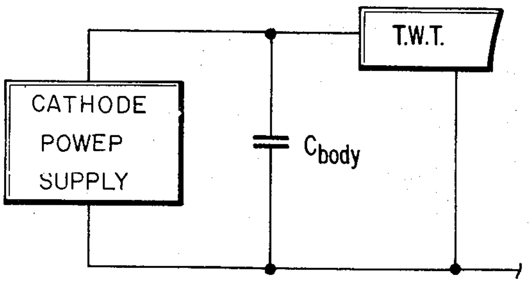
FIG. 2A BODY CAPACITOR SCHEMATIC (PRIOR ART)
FIG. 2B BODY CAPACITOR CIRCUIT (PRIOR ART)
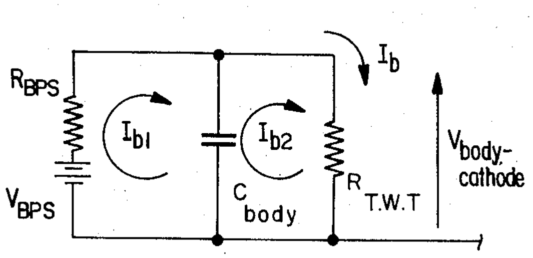
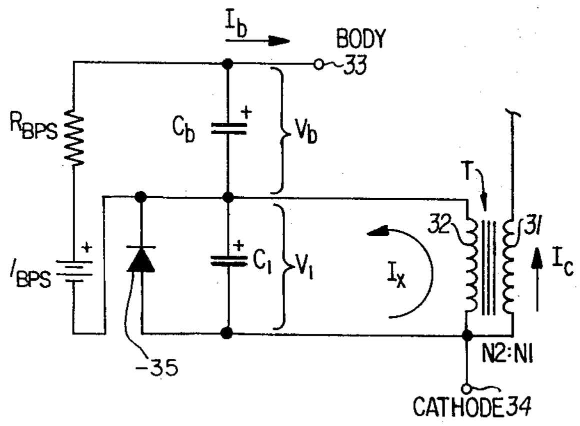
FIG. 3 DROOP COMPENSATION CIRCUIT

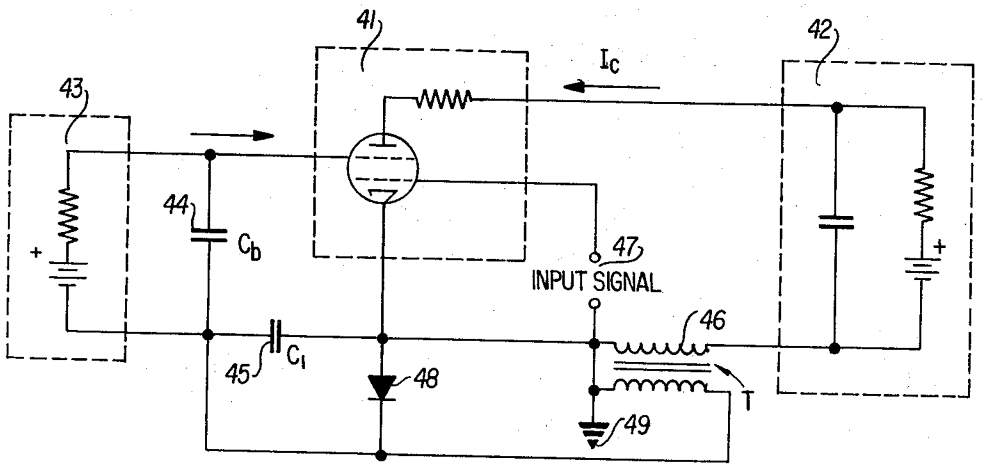
FIG. 4 ANALOG CIRCUIT
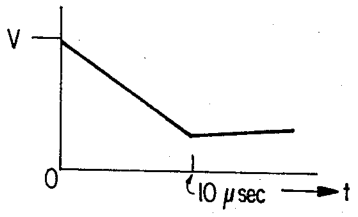
FIG. 5A (PRIOR ART)
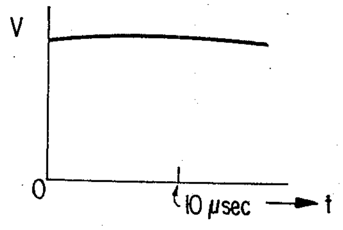
FIG. 5B
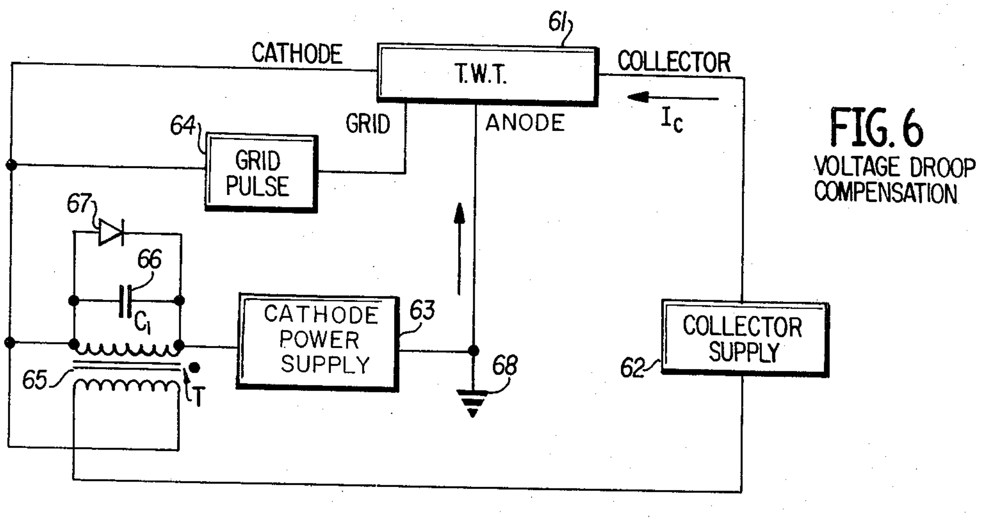
FIG. 6 VOLTAGE DROOP COMPENSATION

VOLTAGE DROOP COMPENSATION CIRCUIT FOR TRAVELING WAVE TUBES

BACKGROUND OF THE INVENTION

1. Field of the Invention

This invention relates to energizing circuits for traveling wave tubes and, more particularly, to a circuit for compensating for the voltage droop of the body experienced during the pulse time of a traveling wave tube.

2. State of the Prior Art

As is well known, during the time of response of a traveling wave tube (hereinafter T.W.T.), to an input pulse, a drop in the voltage level is experienced between the body and cathode connections of a T.W.T. This drop is characterized as a "voltage droop"; its effect is to produce variations in the phase and amplitude output characteristics of the T.W.T. In most applications, and particularly in radar transmitters, it is very important that the voltage droop between the T.W.T. body and cathode be kept small during the pulse time in order to maintain low phase and amplitude distortion. The body of the T.W.T. is alternatively known as the shell and occasionally as the anode, as that element is shown and described in Rambo U. S. Pat. No. 3,150,331. Numerous configurations of T.W.T.'s are known in the art and their distinctions from conventional vacuum tubes having envelopes of non-conductive material, e.g., glass, are well recognized. Whereas in conventional vacuum tubes, the envelope is not considered a part of the electrical circuit of the tube, in the case of a T.W.T., the casing, or envelope, or shell may itself be a conductor and is considered as an electrical component, or electrode, of the tube.

In the prior art, a technique for minimizing the droop is to connect an energy storage capacitor between the cathode and the body of the T.W.T., which capacitor is charged from the body supply during interpulse intervals, thereby to afford an additional energy source during the pulse time, or pulse intervals. However, for large peak body currents and long pulse times, this technique requires an exessively large capacitor for limiting the voltage droop to an acceptable level.

Typical applications impose limitations on the acceptable physical size of the body energy supply capacitor and frequently limit it to a size inadequate to afford the necessary compensation. In addition, the charge storage capability of the capacitor must be selected with due consideration for the amount of energy stored therein such that safety limits are not exceeded in the T.W.T. under arcing conditions. As a result, adequate compensation frequently cannot be provided and thus degradation of the phase and amplitude output characteristics of the T.W.T. must be accepted in the system.

SUMMARY OF THE INVENTION

These and other defects and limitations of the prior art droop compensation techniques are overcome by the invention. Generally, the invention provides for coupling energy from the less critical collector supply to the body supply during the pulse time thereby to compensate for the voltage droop and maintain an acceptable body to cathode voltage. In this presentation, the term "body" is understood to designate the shell of the T.W.T. and which, further, as in the case of Rambo U. S. Pat. No. 3,150,331 may, as well, designate the anode. Moreover, the terminology of body power supply, body supply energy storage capacitor, or the like, is employed to designate the circuit components which establish the necessary voltage difference between the body and the cathode and hence alternatively could be characterized as the cathode supply source, or cathode energy storage capacitor, and the like.

More particularly, the compensation circuit of the invention employs a transformer and two capacitors of greatly reduced physical size and electrical capacitance relative to the energy storage capacitor of the prior art; in fact, the body supply energy storage capacitor is reduced to a fraction of its size as required in prior art circuits. Moreover, voltage droop actually experienced is substantially diminished, and in many instances is virtually eliminated.

One capacitor serves as the body energy storage capacitor of the prior art and is accordingly connected to the body of the T.W.T. The other capacitor is connected in series with the first and to the cathode of the T.W.T. A transformer having a primary winding in the collector circuit and a secondary winding in parallel with the compensation capacitor serves to couple energy from the former to the latter supply circuits. The effect is to produce a voltage rise in the compensation capacitor, thereby compensating for the drop in the voltage of the body supply, and thus of the T.W.T. body, during pulsing intervals.

BRIEF DESCRIPTION OF THE DRAWINGS

FIG. 1 comprises a simplified schematic, in block diagram form, of a prior art energizing circuit for a traveling wave tube;

FIG. 2A comprises a simplified schematic, in block diagram form, of the prior art technique employing a anode-cathode energy storage capacitor for reducing voltage droop;

FIG. 2B comprises an equivalent circuit of the body supply schematic of FIG. 2A for facilitating a description of the operation thereof;

FIG. 3 comprises a schematic in equivalent circuit form of the droop compensation circuit for the anode-cathode supply of a T.W.T. in accordance with the invention;

FIG. 4 comprises a schematic of an analog circuit utilized for demonstrating the operability of the voltage droop compensation circuit of the invention with traveling wave tubes;

FIGS. 5A and 5B comprise wave form plots of the voltage droop on an anode-cathode supply energy storage compensation capacitor and the total droop experienced between the anode and cathode of a traveling wave tube as compensated in accordance with the circuit of the invention; and FIG. 6 comprises schematic in block diagram form of an energization circuit for a traveling wave tube incorporating the voltage droop compensation circuit of the invention.

DESCRIPTION OF THE INVENTION

In FIG. 1 is shown a simplified block diagram schematic of a prior art energizing circuit for a traveling wave tube (hereinafter T.W.T.) 10. The input and output terminals of the T.W.T. 10 are designated as grid 11, cathode 12, collector 13, and body 14. Collector and body power supplies 15 and 17 are connected to the collector and body terminals 13 and 14 respectively. When an input signal pulse, shown as $V_{input}$, is applied to the grid 11, a current $I_c$ is established in the path from the collector power supply 15 to the T.W.T. collector 13 and through the T.W.T. 10 and its cathode 12, thereby completing the current loop.

As noted hereinabove, the term "body" as employed herein designates the shell or casing of the T.W.T. 10 and may, as well, designate an anode as seen, for example, in Rambo U. S. Pat. No. 3,150,331. Hence, the body supply 17 in FIG. 1 or the capacitor $C_{body}$ in FIG. 2A et seq may similarly be considered as cathode power supply or cathode capacitor, respectively, the function in any event clearly being that of maintaining a desired $V_{body\text{-}cathode}$. Moreover, as seen from the noted Rambo patent and as illustrated and discussed in connection with FIG. 6 herein, the body potential typically is maintained at system ground and the cathode potential correspondingly is substantially negative relative to that ground. Accordingly, inasmuch as the invention serves to maintain a desired voltage between the body and the cathode electrodes, and where the potential of the body electrode is visualized as at system ground, the compensation afforded by the circuit of the invention may alternatively be considered as compensation for droop in the cathode voltage, as expressed in the abovenoted Rambo patent.

In the following, therefore, reference to "body" will be understood to mean the shell or anode both as to the current $I_b$ termed body current and as to the voltage between the body and cathode, $V_{body\text{-}cathode}$, i.e., the latter term to be understood to mean the voltage between the cathode and the electrode variously termed the body or the anode or the shell. Likewise, the body capacitor $C_{body}$ will be understood to be the conventional capacitor normally connected between the anode, or body, and the cathode and the body power supply producing the voltage $V_{BPS}$ will be understood to supply the voltage difference between the cathode and the body, or anode, and hence to produce the quiescent body current $I_{b1}$ as well as that contribution to the total body current $I_b$ required during pulsing of the T.W.T.

During the flow of the collector current $I_c$, the T.W.T. requires a body current $I_b$ for achieving the necessary operating conditions. As the current $I_b$ increases, however, the inherent electrical impedances of the body power supply 17 and the new operating characteristics of the T.W.T. 10 tend to reduce the voltage between the body and the cathode, termed $V_{body\text{-}cathode}$. The change or droop in the voltage $V_{body\text{-}cathode}$ during the time of an input signal produces variations in the performance of the T.W.T. 10, and particularly in the phase and amplitude of the output signal.

It is known to minimize the droop in the voltage $V_{body\text{-}cathode}$ under these conditions, through use of an energy storage capacitor which is connected across body power supply as shown in FIG. 2A. The operation of the body capacitor $C_{body}$ is illustrated in FIG. 2B. In the quiescent state of the T.W.T., its internal resistance, show as $R_{T.W.T.}$, is very large and current $I_{b2}$ is therefore very small. During this interval, the body capacitor $C_{body}$ charges to to approximately the voltage $V_{BPS}$ of the body power supply. Any quiescent body current requirements are supplied by $I_{b1}$.

During the input pulse times, however, resistance $R_{T.W.T.}$ is very low and the required level of the current $I_b$ becomes quite high. The contribution $I_{b1}$, from the body power supply to the body current $I_b$, however, is limited by the inherent series resistance $R_{BPS}$ of the body power supply. In an effort to satisfy the increasing body current requirements, capacitor $C_{body}$ discharges, supplying an additional current $I_{b2}$ to the body current $I_b$.

As is well known, the voltage $V_{body\text{-}cathode}$ will decrease, or droop, from its value at quiescent conditions as a function of the time constant $C_{body}R_{T.W.T.}$. The amount of voltage droop is a function of the current requirements, $I_b$, the size of the capacitor $C_{body}$, and the length of time, i.e., the pulse duration or width, of the input signal.

For a given system, the amount of droop can be reduced by increasing the size of the storage capacitor. Practical considerations, however, place limits on the permissible size of the storage capacitor. Hence, adequate compensation cannot be afforded under most circumstances by this prior art technique and thus degraded performance must be tolerated.

More specifically, these limitations may arise from size limitations imposed by the particular application of the T.W.T. Further, the arcing conditions before noted present substantial limitations on the permissible size of the body capacitor. The potential hazard is well illustrated in FIG. 2B. When the T.W.T. arcs internally under inadvertent conditions, the effective value of resistance $R_{T.W.T.}$ is again very low and the energy stored in capacitor $C_{body}$ is available to be dumped into the T.W.T. and dissipated therein. The larger the value of $C_{body}$ to meet time constant or minimum droop requirements, the greater is the energy stored in the capacitor and accordingly the greater is the hazard of the arcing.

The compensation circuit of the invention permits substantial reduction in the capacity of the body energy storage capacitor, and thus removes the foregoing difficulties attendant to large such capacitors while reducing the voltage droop experienced in prior art circuits. In general, in accordance with the invention, energy is transferred from the less critical collector supply to maintain the body voltage and thereby minimize the droop. The mechanism, or circuit, for accomplishing this function includes a compensation capacitor for the body capacitor which receives energy from the collector supply during pulsing, thereby compensating the voltage level of the body energy storage capacitor for maintaining the desired and requisite voltage $V_{body\text{-}cathode}$.

Referring now to FIG. 3, there is provided in series circuit with the energy storage capacitor $C_b$ a compensation capacitor $C_1$. Current $I_c$ from the collector power supply passes through primary winding 31 of transformer T. According to the principles of transformer action, current $I_x$ in the secondary winding will be established as a function of the turns ratio N2:N1. Current $I_x$ then charges capacitor $C_1$ for the time duration of current flow, and hence for the time period of the input signal. As charge builds up in capacitor $C_1$, the voltage potential $V_1$ increases with the polarity as shown by the plus (+) sign on capacitor $C_1$. Prior to the input signal pulse time, or during the period of time between input pulses, i.e., the interpulse period, capacitor $C_b$ is charged to the voltage potential $V_b$ with the polarity shown. Note that the recharge current path from the body power supply $V_{BPS}$ is established through resistance $R_{BPS}$, discussed previously, and the capacitor $C_b$.

The voltage of concern as to droop compensation is the voltage between the body 33 and the cathode 34 of the T.W.T. This voltage is the algebraic sum of voltages $V_b$ and $V_1$, the potentials across capacitors $C_b$ and $C_1$ respectively. Recalling the current demands of the T.W.T. on $I_b$ during pulsing, it is seen from FIG. 3 that as voltage $V_b$ drops due to capacitor $C_b$ supplying the needed current $I_b$ to the body, voltage $V_1$ across capacitor $C_1$ increases as a function of current $I_x$. The drop in voltage $V_b$ is then compensated by a corresponding increase in voltage $V_1$ across $C_1$ to yield a net voltage potential between the body and cathode of the T.W.T. which remains essentially constant.

The principles discussed above are represented in the following equations. In Equation 1, the voltage decrease across capacitor $C_b$ is proportional to $-I_b/C_b$ and the voltage increase across capacitor $C_1$ is a function of $+I_x/C_1 . I_x$, of course, includes charging current for $C_1$ and also $I_b$ during pulse time. The purpose of the droop compensation design is to maintain the sum of these voltage variations at zero. That is:

$$-I_b/C_b + (I_x - I_b)/C_1 = 0 \quad (1)$$

Letting $n = N_2/N_1$, the transformer turns ratio, the current $I_x$ is related to $I_c$ by $n = I_x/T_c$ and Equation 1 can be rearranged and written as in Equation 2:

$$I_b/I_c + (I_bC_1/I_bC_b) \quad (2)$$

which gives the basic design equation for the transformer T:

$$n = (I_b/I_c)\ (1 + C_1/C_b) \quad (3)$$

The maximum value of capacitor $C_b$ is determined by the minimum amount of stored energy allowed during a potential arcing condition. For any application, the value of $C_b$ is determined by:

$$C_b = 2W/V_b2 \quad (4)$$

Where $C_b$ = capacitance in units related to $W$ $W$ = energy in selected units $V_b$ = voltage across capacitor as before A further consideration involves the charging time of capacitor $C_1$ to maintain linear compensation. From experience with an analog circuit to be discussed subsequently it has been found that the charging time of $C_1$ should be 10 times larger than the input signal pulse time $T$, and thus:

$$2n\ \sqrt{L_{o.c.}\ C_1} = 10T \quad (5)$$

Where $L_{o.c.}$ = open circuit inductance of the secondary winding 32, of the transformer T.

$C_1$ = capacitance of $C_1$ $T$ = pulse time

To prevent oscillation in the LC network formed by capacitor $C_1$ and transformer winding 32, a diode 35, FIG. 3, is used to shunt the reverse current of the transformer T when current $I_c$ decreases due to the termination of the pulse period of the input signal.

In the investigation described by this disclosure, analog T.W.T circuits have been tested experimentally to verify that droop compensation is achieved for T.W.T. operation using a transformer to transfer collector energy to the body supply. Shown in FIG. 4 is an analog circuit where the T.W.T. is simulated by a 6L6GC type vacuum tube 41. The screen circuit of the 6L6GC simulates the body of the T.W.T. and power supply 43 is equivalent to the body power supply. The plate circuit of the 6L6GC simulates the collector of the T.W.T. and power supply 42 is equivalent to the collector power supply. The cathode and grid of the 6L6GC are equivalent to the T.W.T. cathode and grid respectively. An input signal is imposed on the grid at 47.

The droop compensation circuit includes the transformer T, having primary and secondary windings $T_p$ and $T_s$, a body capacitor $C_b$ shown at 44, a droop compensation capacitor $C_1$ shown at 45, and a shunt diode 48. Also noted are the equivalent body and collector currents, $I_b$ and $I_c$ respectively. To complete the analog circuit, a ground terminal is identified at 49. It is noted that the ground terminal is relative and will take a different position in the circuit of a T.W.T. to be discussed subsequently.

For a given value of $C_b$ in the circuit of FIG. 4, an uncompensated voltage droop across $C_b$ was measured for a 40 $\mu$ second duration input signal pulse as shown in FIG. 5A. The droop corresponds to a 10 percent decrease in body voltage. The droop is compensated, however, by an increase in voltage across capacitor $C_1$ so that the actual voltage between the screen and cathode circuits of the 6L6GC in FIG. 4 varies less than 0.5 percent as shown in FIG. 5B. Note that the voltage measurement in FIG. 5B was made between cathode and screen, and thus represents the compensated voltage, showing that the screen potential is maintained substantially constant relative to the cathode. The capacitive size and the energy stored in $C_b$ would have to be increased 36 times to obtain the small droop shown in FIG. 5B. Therefore, the energy stored in $C_b$ is effectively reduced by a factor of 1/36 in the circuit of the invention, relative to a prior art circuit as in FIG. 1 employing just a body capacitor, for an equivalent droop-voltage.

The droop compensation circuit of the invention as applied to a T.W.T. is shown in FIG. 6. Similarly to FIG. 1, the circuit includes a T.W.T. 61, a collector supply 62, a body supply 63, and a grid input pulse signal 64. The ground point is now shown at terminal 68, corresponding to the physical body of the T.W.T. Similar to FIG. 4, the droop compensation circuit comprises a transformer 65, capacitor $C_1$ shown at 66, and shunt diode 67. Collector and body currents are shown as $I_c$ and $I_b$ respectively. As previously noted, the circuit of the invention permits minimizing the value of the body energy storage capacitor $C_b$. Indeed, conventional body power supplies as utilized for a T.W.T. include internal capacitance such as required for filtering and which present an effective energy storage capacitance in parallel with the power supply source. The value of capacitor $C_b$ as defined hereinabove thus will be understood to be the sum total of the body supply output capacity. Hence, a discrete capacitor affording the capacitance $C_b$ has not been shown in FIG. 6 but is considered as included within the diagrammatic body supply 63 in parallel with the body power supply source such as illustrated in FIG. 2A or in the analog circuit of FIG. 4 and thus corresponding to the actual droop compensation circuit for a T.W.T. in accordance with the invention as shown in FIG. 3. In any event, the sum total of that body supply output capacity, $C_b$, would be visualized as connected in series with the compensation capacitor $C_1$ (element 66) and the ground terminal 68.

It will be apparent to those skilled in the art that numerous modifications and adaptations may be made to the circuit of the invention to achieve the compensation function in accordance with the technique here involved and thus it is intended by the appended claims to cover all such modifications and adaptations as fall within the true spirit and scope of the invention.

What is claimed is:

1. For use with a traveling wave tube having a grid, a cathode, a collector, and an anode having collector and cathode power supplies, a voltage droop compensation circuit comprising:

- a transformer having primary and secondary windings,
- said primary winding being connected in series circuit with the collector power supply between the collector and cathode of the traveling wave tube,
- said secondary winding being connected in series circuit with the cathode power supply between the anode and the cathode of the traveling wave tube, and
- said transformer coupling energy from the collector power supply through said primary winding to said secondary winding in said series circuit with said cathode power supply, said secondary winding being so related to said primary winding as to produce a voltage aiding that of the cathode power supply to compensate for droop in the cathode to anode voltage of the traveling wave tube during pulsing.

2. A compensation circuit as recited in claim 1 wherein:

- said cathode power supply includes an energy storage capacitor connected in parallel with the cathode power supply and charged from the cathode power supply during interpulse periods of the traveling wave tube to assist in maintaining the anode to cathode voltage of the traveling wave tube during pulsing, and there is further provided:
- a compensation capacitor connected in parallel with said secondary winding and in series circuit with said energy storage capacitor and to the cathode of the traveling wave tube, and
- said transformer couples energy from said collector supply during pulsing of the traveling wave tube to charge said compensation capacitor and produce a voltage rise thereacross adding to the voltage of the energy storage capacitor as the latter discharges during pulsing of the traveling tube and thereby compensating for droop of the cathode to anode voltage during pulsing time.

3. A compensation circuit as recited in claim 2 wherein the charging time of the compensation capacitor is approximately 10 times larger than the input signal pulse time.

4. A compensation circuit as recited in claim 2 wherein there is further provided a uni-directional conducting device connected in parallel with the compensation capacitor and so poled so as to prevent oscillation in the LC network formed by the compensation capacitor and the secondary winding of the transformer upon termination of pulsing.

5. A compensation circuit as recited in claim 1 wherein $n = N2/N1$, the turns ratio of the primary and secondary windings $N_1$ and $N_2$, respectively, is expressed by:

$$n = (I_b/I_c)[1 + (C_1/C_b)] \quad (3)$$

wherein $I_b$ is the anode current, $I_c$ is the collector current, and $C_b$ and $C_1$ are the capacitances of the energy storage capacitor and the compensation capacitor, respectively, and furthermore:

$$C_b = 2W/V_b^2 \quad (4)$$

wherein $W$ is the energy to be supplied in selected units and $V_b$ is the requisite cathode to anode voltage, and $C_b$ is capacitance in units related to $W$.

* * * * *